Sept. 30, 1952　　　　F. G. SCHWEISTHAL　　　　2,612,326
HOSE REEL

Filed Sept. 27, 1950　　　　　　　　　　　　5 Sheets-Sheet 1

Fig.1.

Inventor:
Frederick G. Schweisthal
By Hinkle, Horton, Ahlberg & Wupper
Attys.

Sept. 30, 1952 F. G. SCHWEISTHAL 2,612,326
HOSE REEL
Filed Sept. 27, 1950 5 Sheets-Sheet 4

Inventor:
Frederick G. Schweisthal
By Hinkle, Horton, Ahlberg & Wupper,
Attys.

Sept. 30, 1952  F. G. SCHWEISTHAL  2,612,326
HOSE REEL
Filed Sept. 27, 1950  5 Sheets-Sheet 5

Inventor:
Frederick G. Schweisthal
By Hinkle, Horton, Ahlberg & Wupper
Attys.

Patented Sept. 30, 1952

2,612,326

UNITED STATES PATENT OFFICE 2,612,326

HOSE REEL

Frederick G. Schweisthal, Skokie, Ill., assignor to Stewart-Warner Corporation, Chicago, Ill., a corporation of Virginia Application September 27, 1950, Serial No. 187,004

11 Claims. (Cl. 242—86)

This invention relates to hose reels and particularly to reels permitting manual unwinding of a hose and having power operated means such as a mechanism operated by compressed air for rewinding the hose.

An object of the invention is to provide a hose reel having an air powered winding mechanism and a control valve apparatus for regulating the resistance which the reel offers to unwinding of the hose.

A further object is to provide a hose reel having an air powered rewinding means and a valve mechanism to control the transmission of compressed air to the rewinding means.

A further object is to provide a hose reel having an air powered rewinding means and a control valve mechanism to initiate the transmission of air to the rewinding means in response to an outward pull on the hose, followed by a slackening of tension on the hose.

A further object is to provide a hose reel having an air powered rewinding mechanism and a control mechanism providing positive rewinding torque on the reel even under adverse operating conditions.

A further object is to provide a hose reel having a control mechanism to prevent unwinding of the hose due to gravity, should the air pressure drop below a predetermined value which is insufficient to operate the rewinding mechanism.

Further objects and advantages of this invention may be derived from the following complete description of an illustrative embodiment of the invention, taken together with the drawings, in which.

Figure 1:
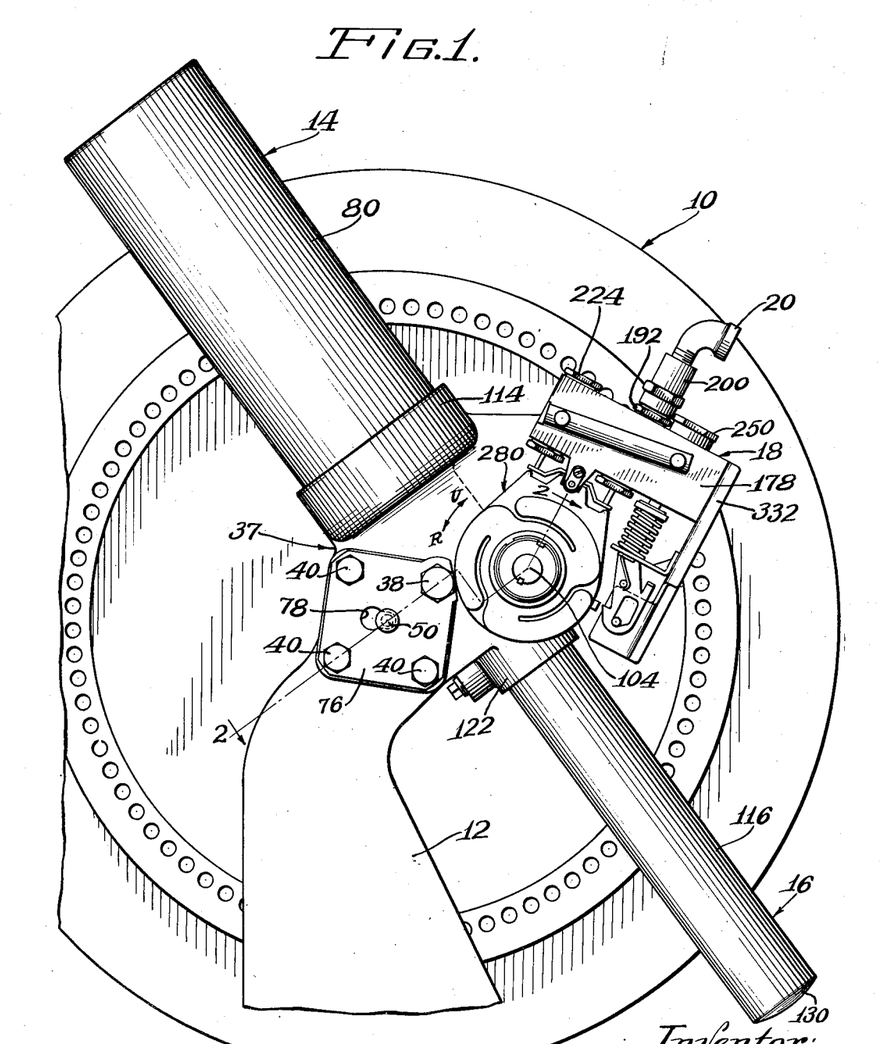
Fig. 1 is a side elevational view of the hose reel including the air powered rewinding means and the control mechanism.

In Fig. 1, a hose reel 10 is rotatably mounted on a base or standard 12. The reel is provided with an air powered operating means including an air cylinder 14, a hydraulic snubber or shock absorber 16, and a control mechanism 18 for regulating reeling and unreeling.

Figure 2:
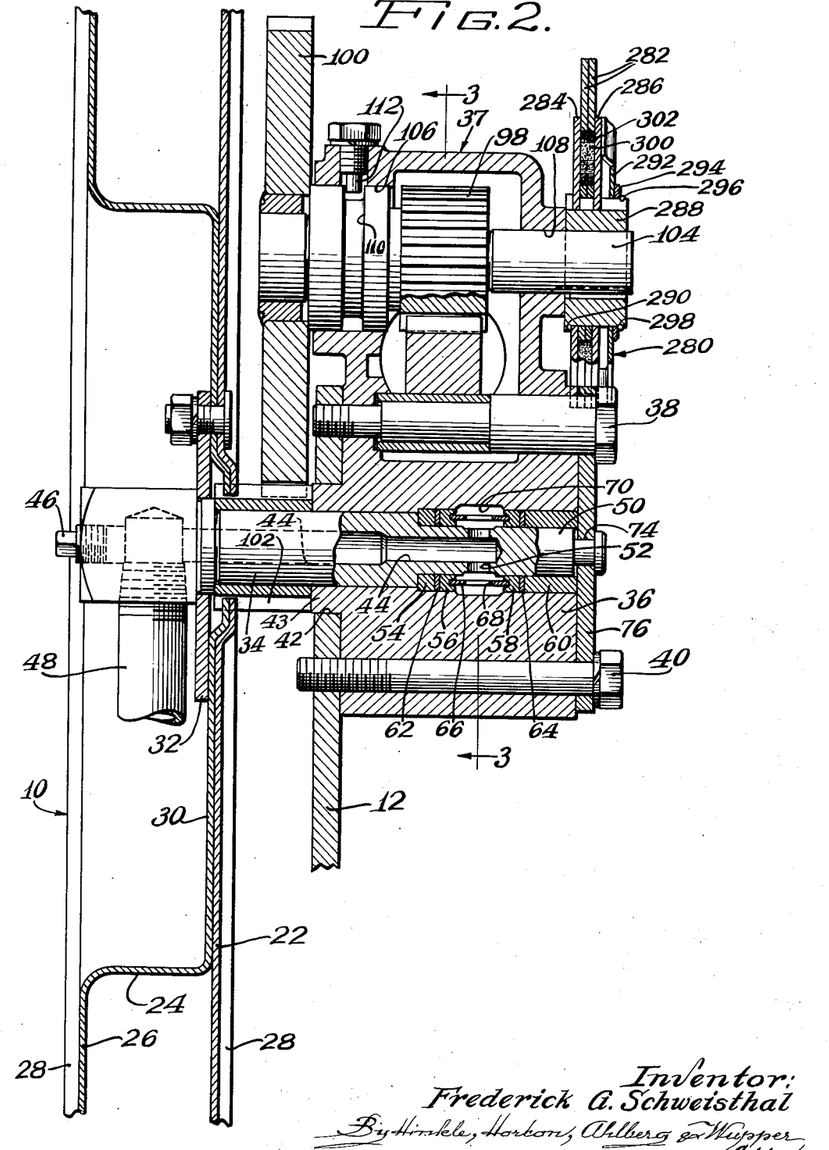
Fig. 2 is a fragmentary sectional view of the hose reel taken on the broken line 2—2 of Fig. 1 and drawn to a larger scale than Fig. 1.

The reel 10 may assume a variety of forms, such as that illustrated in Fig. 2. The reel comprises a sheet metal disc 22 and a narrow sheet metal drum 24. The disc 22 and a radially extending flange portion 26 of the drum 24 are adapted to provide lateral support for a plurality of hose coils (not shown) which may be wound upon the reel. The peripheral edges of the disc 22 and the drum 24 have outwardly turned reinforcing flanges 28.

The disc 22 and a disc-shaped end portion 30 of the drum 24 are secured to a flange 32 fixed to a shaft 34 which is journaled in a bearing 36 forming a part of a casting 37 secured to the standard 12 by bolts 38 and 40. As shown, the standard 12 may be formed from a heavy steel plate material and may have an opening 42 for receiving an annular boss 43 extending from the bearing 36. As shown in Fig. 2, the bearing 36 is positioned on the right-hand side of the standard 12 and the shaft 34 extends through the standard 12, and beyond the left-hand side of the bearing for supporting the reel 10 on the left-hand side of the standard 12. This structure is rigid and compact.

A fluid, such as lubricant, may be supplied in some suitable manner to a hose wound on the reel, such as by means of an axial passageway 44 extending part way through the shaft 34. The left-hand end of the passageway 44 adjacent the reel 10 is closed by a plug 46 and is connected with a radially extending nipple conduit fitting 48 which may be connected with one end of a hose, not shown.

The right-hand portion of the shaft 34 has a reduced diameter to form a stem 50 having a plurality of radial apertures 52 communicating with the axial passageway 44. The axial passageway 44 extends from the left-hand end of the shaft 34 rightwardly beyond the apertures 52, but does not extend to the right-hand end of the shaft.

A plurality of bushings 54, 56, 58 and 60 are assembled from left to right between the stem 50 of the shaft and the bearing 36. A packing ring 62 is compressed between the bushings 54 and 56 and a similar packing ring 64 is compressed between the bushings 58 and 60.

The bushings 56 and 58 are separated by a tubular spacer 66 having a plurality of generally radial apertures 68.

A chamber 70 for the passage of lubricant is provided opposite the shaft apertures 52 between the shaft and the bearing 36, and the tubular spacer 66 is positioned in the chamber.

Figure 3:
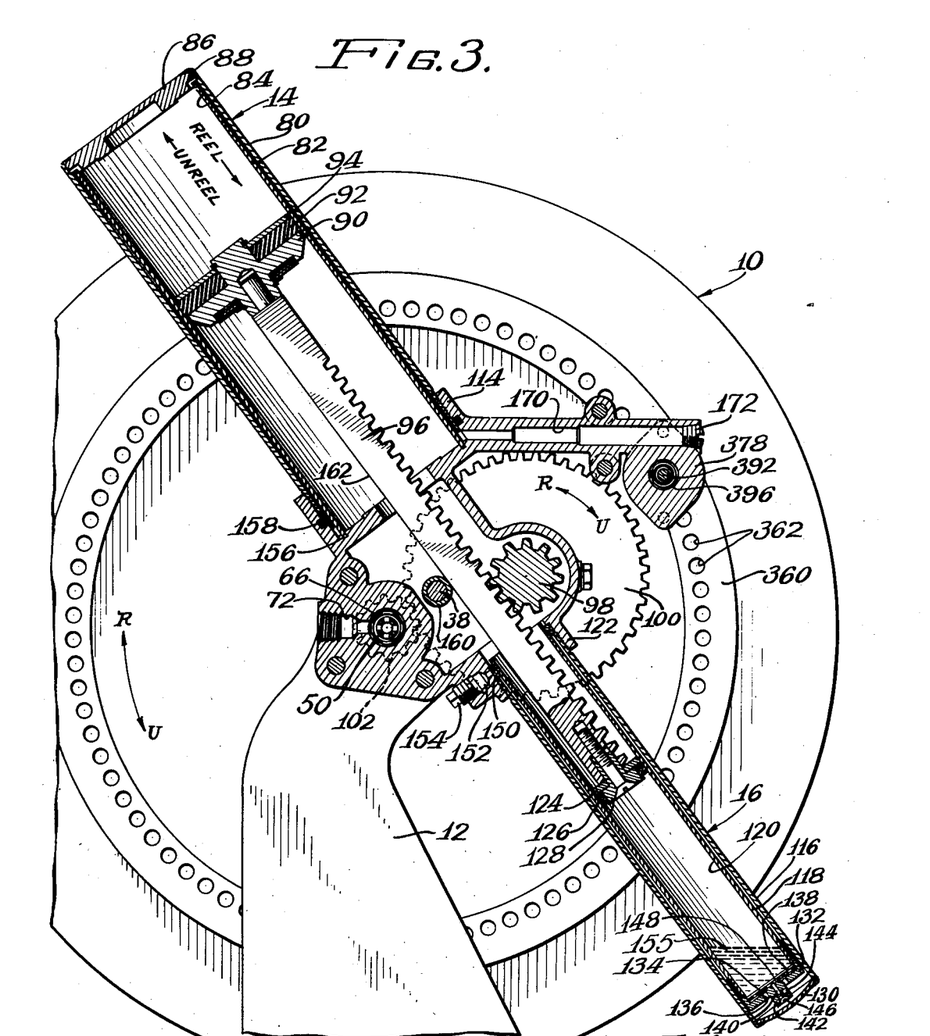
Fig. 3 is a side sectional view taken on the line 3—3 of Fig. 2 and drawn to the same scale as Fig. 1.

As best shown in Fig. 3, a radial bore 72, extending through the bearing 36, provides a means for supplying lubricant from a pressure source to the chamber 70. The bore 72 is internally threaded to receive a pipe fitting (not shown) for connecting the hose reel with a lubricant source.

The extreme right-hand end of the shaft 34 is grooved to form a neck 74 (Fig. 2). A thrust plate 76 secured to the bearing 36 by the bolts 38 and 40 has a keyhole opening 78 (Fig. 1) for engaging the neck 74 of the shaft 34.

As best shown in Fig. 3, the air cylinder 14 comprises an outer wall or cylinder 80 and an inner wall or cylinder 82. An annular space or chamber 84 between the cylinders 80 and 82 provides an air passageway. The outer end of the outer cylinder 80 is closed by a disc-shaped plug 86 which has an inwardly facing peripheral groove 88 to provide communication between the interior of the inner cylinder 82 and the annular passageway 84.

A piston 90 having an outwardly facing packing ring 92 retained by a washer 94 is slidably positioned within the inner cylinder 82 of the air cylinder 14. The upper end of a toothed rack 96 is secured to the inner end of the piston 90. The rack 96 and the air cylinder 14 are positioned at an inclined angle.

An operating connection between the piston 90 and the reel 10 is provided by gearing including a pinion 98 meshing with the rack 96, a gear 100 coaxially fixed to the pinion 98, and a pinion 102 engaging the gear 100 and fixed to the shaft 34 supporting the reel 10.

As best shown in Fig. 2, the pinion 102 is positioned on the reel shaft 34 between the bearing 36 and the reel 10 on the left-hand side of the standard 12. The gear 100 and the pinion 98 are fixed to a shaft 104 journaled in bearings 106 and 108 which may be formed integrally with the casting 37. The rack 96 passes between the shaft 104 and the reel shaft 50.

The shaft 104 has an enlarged diameter between the gear 100 and the pinion 98 where the shaft 104 engages the bearing 106 and is provided with a peripheral groove 110 to receive a thrust pin 112 secured to the bearing 106. The gear 100 is secured to the left-hand end of the shaft 104 and is positioned to mesh with the pinion 102.

The outer cylinder 80 of the air cylinder 14 is threaded into a collar 114 which may be formed integrally with the casting 37.

The hydraulic snubber or shock absorber 16 comprises an outer cylinder or wall 116 and an inner cylinder or wall 118 which are dimensioned to provide an annular space or chamber 120 between the inner and outer walls. The outer end of the outer wall 116 is threaded into a collar 122 which may be formed integrally with the casting 37. The shock absorber 16 is thereby positioned coaxially with the air cylinder 14 but extending in the opposite direction. A piston 124 having an outwardly facing packing ring 126 retained by a shouldered washer 128 is positioned within the inner cylinder 118 of the shock absorber 16. The piston 124 is secured to the rack 96 at the end opposite the air cylinder piston 90.

The outer end of the outer cylinder 116 of the snubber 16 is closed by an outwardly convex disc 130. A cap 132 is threaded to the outer end of the inner cylinder 118 of the snubber 16. A valve disc 134 is movably positioned between the cap 132 and the outer end of the inner cylinder 118. The valve disc is engageable with the cap 132 to close a plurality of apertures 136 in the cap 132 and is movable inwardly to provide communication through the apertures 136 and a plurality of apertures 138 in the disc 134.

An aperture 140 extends centrally through the cap 132 and through a short stem 142 protruding outwardly from the cap 132. A radial aperture 144 extends from the central aperture 140 through the stem 142. The outer end of the aperture 140 is closed by a screw 146 which also serves to constrict the radial aperture 144. A central aperture 148 in the disc 134 is aligned with the central aperture 140 in the cap 132.

A ring 150 is positioned within the collar 122 for sealing engagement with the inner cylinder 118 of the shock absorber 16 and the inner surface of the collar 122. An opening 152, extending radially through the collar 122 and closed by a threaded plug 154, is provided for introducing a small quantity of liquid, shown at 155, such as alcohol or oil into the annular space between the outer and inner walls 116 and 118, and thence into the interior of the inner cylinder 118, as shown.

The inner end of the inner cylinder 82 of the air cylinder 14 is positioned in an annular groove 156 in the collar 114 for sealing the annular space 84 between the inner and outer cylinders of the air cylinder 14. A gasket 158 is positioned between the inner end of the outer cylinder 80 of the air cylinder 14 and the collar 114.

The mounting bolt 38 for the bearing 36 supports a roller 160 which engages a longitudinal surface 162 of the rack 96 opposite the pinion 98 which meshes with the rack. The roller 160 provides lateral support for the rack 96 and maintains the rack accurately in mesh with the pinion 98.

A drilled conduit 170 communicates with the annular space 84 between the outer and inner cylinders 80 and 82 of the air cylinder 14 and extends horizontally in a radial plane from the collar 114. The end of the conduit remote from the collar 114 is closed by a threaded plug 172. A transverse passage 174, shown in Figs. 4, 5 and 7, communicates with the conduit 170 near the plug 172 and opens into a cylindrical chamber 176 (Fig. 5) in a valve body 178.

An inclined passage 180 (Figs. 4 and 5) connects the cylindrical chamber 176 with a lower cylindrical inlet valve chamber 182, which is closed at its lower end by a threaded plug 184. An inlet valve stem 186 extends through the plug 184, the chamber 182 and a clearance hole 188 in the upper end of the chamber 182. The clearance hole 188 opens into an upper cylindrical inlet valve chamber 190 closed at its upper end by a nipple fitting 192. A valve disc 194, fixed to the upper end of the valve stem 186, normally seats over the upper end of the clearance hole 188 connecting the lower valve chamber 182 with the upper valve chamber 190. The disc 194 and the stem 186 are movable upwardly to provide communication between the upper and lower valve chambers through the clearance hole 188 around the stem 186.

Figures 4, 5:
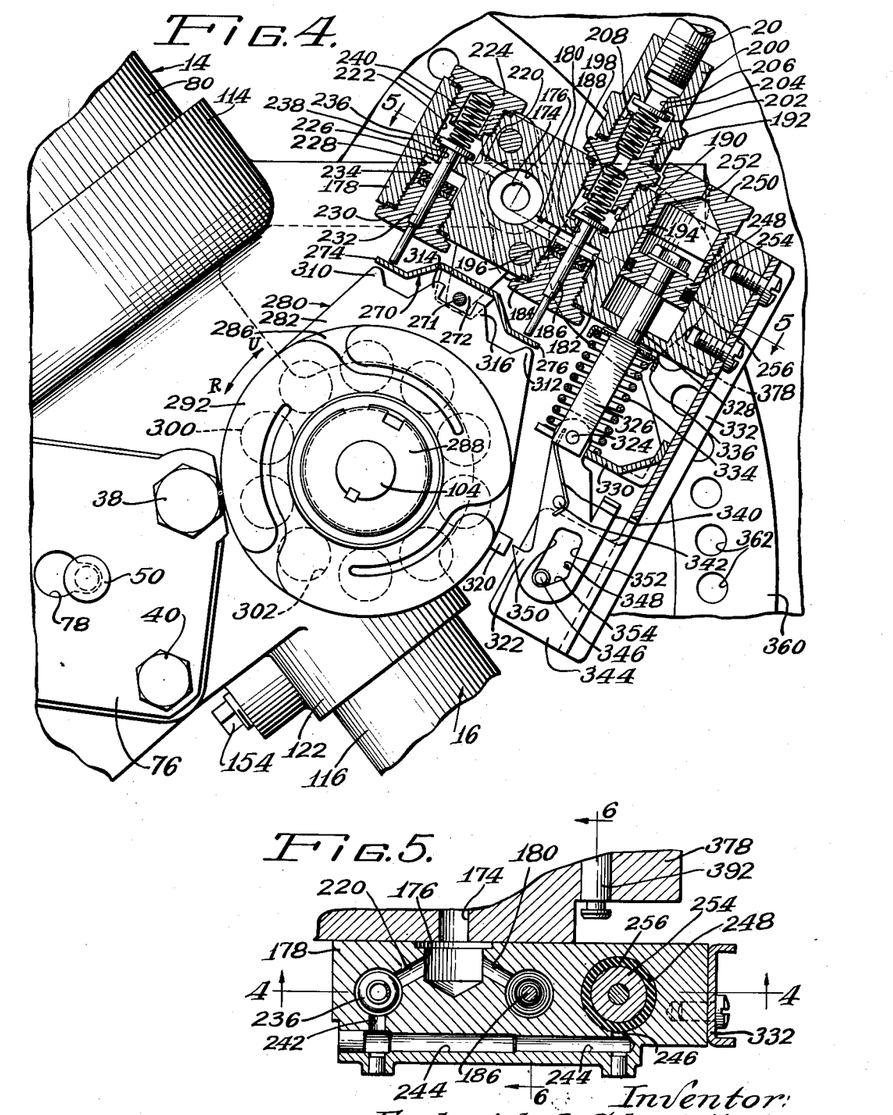
Fig. 4 is a fragmentary side view, drawn to the same scale as Fig. 2, showing the control valve mechanism in a section taken on the line 4—4 of Fig. 5.
Fig. 5 is a fragmentary sectional view taken on the line 5—5 of Fig. 4.

A packing ring 196 prevents the escape of air through the plug 184 around the valve stem 186.

A helical spring 198 is compressed between the valve disc 194 and the nipple fitting 192 for biasing the disc normally to close the clearance hole 188.

A tubular collar 200 is threaded to the upper end of the nipple fitting 192. A check valve disc 202 is positioned within the collar 200 for engagement with an inwardly facing valve seat 204 for closing a central passage 206 extending through the collar 200, to prevent outward flow of air through the collar. A helical spring 208 is compressed between the nipple fitting 192 and the check valve disc 202 for biasing the disc against the valve seat 204.

The outer end of the collar 200 is threaded to receive the air inlet fitting 20, also shown in Fig. 1.

A diagonal passage 220 connects the cylindrical chamber 176 with a cylindrical upper venting valve chamber 222 closed at its upper end by a threaded plug 224. An aperture 226 coaxial with the upper chamber 222 connects the upper chamber with a lower venting valve chamber 228 closed at its lower end by a threaded plug 230. A venting valve stem 232 extends through the plug 230, a packing ring 234 positioned between the stem and the plug, the lower cylindrical chamber 228, and the aperture 226. A venting valve disc 236, fixed to the upper end of the stem 232, is movable into sealing engagement with a valve seat 238 positioned around the upper end of the aperture 226. A helical spring 240, compressed between the plug 224 and the venting valve disc 236, biases the disc toward engagement with the valve seat 238.

A passage 242 (Fig. 5) extends radially from the lower venting valve chamber 228 and connects with a diagonal drilled conduit 244 communicating with a radial passage 246 extending into the upper end of a piston cylinder 248.

The piston cylinder 248 is closed at its upper end by a threaded plug 250 having a small axial orifice or vent 252. A piston 254 having a packing ring 256 is positioned within the piston cylinder 248.

A rocker 270 (Fig. 4) is pivoted on a pin 271 mounted on a pillar 272 fixed to the lower side of the valve body 178. A left-hand arm 274 of the rocker 270 is positioned just below the lower protruding end of the venting valve stem 232, and a right-hand arm 276 is positioned just below the protruding end of the inlet valve stem 186. Consequently, clockwise rotation of the rocker 270 lifts the venting valve stem 232, and counterclockwise rotation of the rocker lifts the inlet valve stem 186.

The rocker 270 is operable by a frictional clutch assembly 280 mounted on the shaft 104 supporting the pinion 98 and the gear 100. As best shown in Fig. 2, the clutch 280 comprises a pair of identical camming plates 282 sandwiched between a pair of discs 284 and 286 which are keyed to a hub 288 fixed to the shaft 104. The left-hand disc 284 abuts against a flange 290 formed on the left-hand end of the hub 288. A leftward force is exerted on the right-hand disc 286 by a spring spider 292 retained on the hub 288 by a washer 294 and a split spring wire ring 296 seated in a groove 298 in the right-hand end of the hub 288.

Several discs 300, made of fibre or a metal such as bronze, extend through a plurality of equally spaced aligned apertures 302 in the camming plates 282. The discs 300 frictionally engage the inner surfaces of the discs 284 and 286. The arrangement of the discs 300 is clearly shown in Figs. 2 and 4. The spring spider 292 maintains the discs 284 and 286 in frictional engagement with the discs 300.

The camming plates 282 have aligned projecting left-hand cams 310 and aligned projecting right-hand cams 312. A pair of projecting stops or teeth 314 and 316 are positioned on each of the camming plates 282 between the cams 310 and 312. The camming plates 282 are positioned so that the pivot pin 271 of the rocker 270 is located between the stops 314 and 316 so that the stops respectively limit clockwise and counterclockwise rotation of the camming plates around the hub 288.

The left-hand cam 310 is positioned adjacent the left-hand rocker arm 274, and the right-hand cam 312 is positioned adjacent the right-hand rocker arm 276. The stops 314 and 316 are spaced so that the cam 310 rotates the rocker arm 274 and thereby lifts the venting valve stem 232 sufficiently to unseat the valve disc 236 when the camming plates are rotated clockwise until the left-hand stop 314 engages the pivot pin 271. Similarly, the rocker arm 276 is rotated counterclockwise to lift the inlet valve stem 186 sufficiently to unseat the valve disc 194 when the camming plates 282 are rotated counterclockwise until the right-hand stop 316 engages the pivot pin 271. When the camming plates 282 are in their normal position with the pivot pin located centrally between the stops 314 and 316, neither the left-hand arm 274 nor the right-hand arm 276 of the rocker 270 is engaged by the cams 310 or 312 and neither the venting valve stem 232 nor the inlet valve stem 186 is lifted.

Aligned projecting teeth 320 are positioned on the camming plates 282 approximately ninety degrees clockwise from a point on the plates midway between the rotation limiting stops 314 and 316.

A ratchet pawl 322 is positioned adjacent the aligned teeth 320. The pawl 322 is pivoted on a pin 324 carried on the lower end of a rectangular shank 326 extending from a piston rod 328 which is secured to the piston 254. The outer end of the rectangular shank 326 is guided by an apertured angle bracket 330 mounted on a channel member 332 secured to the right-hand side of the valve body 178 and extending generally parallel to the piston rod 328 and the shank 326. A helical spring 334 is compressed between a spring retaining cup 336 fixed to the rectangular shank 326 and the angle bracket 330, upwardly to bias the piston 254, together with the piston rod 328, the rectangular shank 326 and the ratchet pawl 322.

A wire spring arm 340, extending from the lower end of the rectangular shank 326 and hooked over a pin 342 mounted on the ratchet pawl 322, biases the ratchet pawl leftwardly.

A bracket 344 formed integrally with the channel member 332, is positioned behind and generally parallel with the ratchet pawl 322. A pin 346 mounted on the bracket 344 engages a camming aperture 348 in the ratchet pawl 322, normally to retain the ratchet pawl out of engagement with the aligned teeth 320. The camming aperture 348 has a left-hand generally vertical edge 350 for limiting counterclockwise rotation of the pawl, a right-hand generally vertical edge 352 for limiting clockwise rotation of the pawl, and a lower diagonal edge 354 sloping downwardly to the left. The pawl 322 normally is biased by the helical compression spring 334 and the wire spring arm 340 so that the pin 346 engages the camming aperture 348 at the rounded intersection of the left-hand vertical edge 350 and the lower diagonal edge 354.

A ring 360 (Figs. 1, 3 and 4), in the form of a segment of a disc, is secured to the outer or right-hand side of the disc 22 of the reel 10 as viewed in Fig. 2. The ring 360 has a large number of equally spaced small apertures 362. The ring is positioned concentric with the shaft 34 supporting the reel 10.

Figure 6:
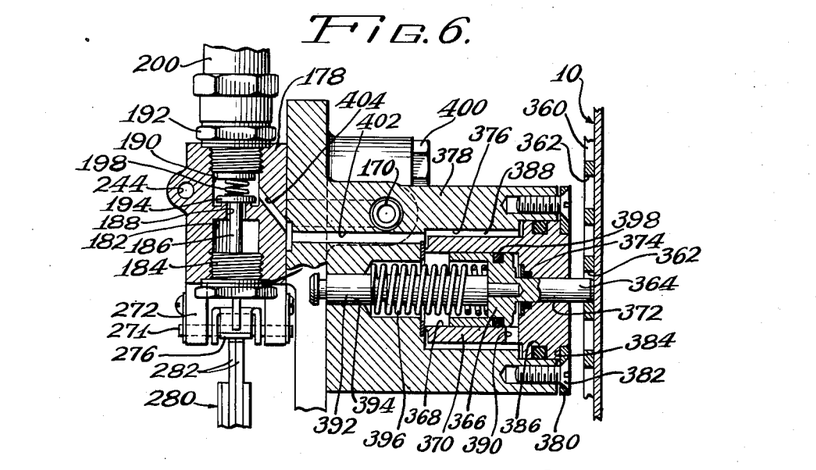
Fig. 6 is a fragmentary sectional view of the control valve mechanism taken on the broken line 6—6 of Fig. 5.

As best shown in Fig. 6, a latching pin 364, extending rightwardly from a latch piston 366, is movable into engagement with an adjacent aperture 362 in the ring 360. The latch piston 366 is slidably positioned in a piston cylinder 368 formed in a generally cylindrical cylinder body 370.

The latching pin 364 extends through a guiding aperture 372 in the right-hand end of the cylinder body 370, and a packing ring 374, positioned between the latch pin 364 and the cylinder body 370, provides an airtight seal.

The cylinder body is retained in a cylindrical bore 376 in a latch body 378 by a retaining plate 380, fastened to the latch body 378 by screws 382 and engaging a shoulder 384 on the right-hand end of the piston cylinder body 370. The outer cylindrical surface of the right-hand end of the piston cylinder body 370 is grooved to receive a packing ring 386 providing an airtight seal between the piston cylinder body and the latch body 378.

The bore 376 in the latch body 378 and the piston cylinder body 370 are dimensioned to provide an annular space or chamber 388 therebetween. The annular chamber 388 is connected with the right-hand end of the piston cylinder 368 by a radial aperture 390 through the cylindrical wall of the piston cylinder body 370.

A piston rod 392 fixed to the left-hand end of the piston 366 is guided by a bore 394 in the latch body 378. A helical spring 396 is compressed between the latch body 378 and the left-hand end of the piston 366 to bias the piston rightwardly. The piston is grooved to receive a packing ring 398 for preventing leakage of air between the piston and the piston cylinder 368.

The latch body 378 may be formed integrally with the casting 37. The control valve body 178 may be secured to the latch body 378 by bolts 400.

The annular chamber 388 between the latch body 378 and the piston cylinder body 370 is connected with the upper inlet valve chamber 190 by a longitudinal passage 402 extending through the latch body 378 and a diagonal passage 404 extending through the valve body 178.

The hose reel of this invention is particularly adapted for reeling heavy hose for carrying lubricant at extremely high pressures. Such a hose may be connected with the nipple fitting 48, shown in Fig. 2, and may be coiled on the reel 10. The reel may be dimensioned to handle about 25 feet of lubricant hose, for example.

The outlet of a lubricant source capable of producing a desired value of lubricant pressure may be connected with the internally threaded bore 72, shown in Fig. 3. Lubricant passes through the bore 72 into the annular chamber 70 (Fig. 2) between the shaft 50 and the bearing 36, and thence through the radial apertures 68 and 52 in the spacer ring 66 and the shaft 50, respectively, into the longitudinal bore 44 in the shaft 50. Lubricant flows outwardly from the bore 44 into the nipple fitting 48 and thence to the hose, which is not shown.

The hose reel of this invention may be prepared for operation by connecting a source of compressed air to the air inlet fitting 20 (Figs. 1 and 4). Referring to Fig. 4, compressed air supplied to the inlet fitting 20 forces the check valve disc 202 from its seat 204 to permit the air to flow through the bore 206 in the collar 200 and thence through the nipple fitting 192 into the upper inlet valve chamber 190.

Referring to Fig. 6, compressed air flows from the upper inlet valve chamber 190 through the diagonal passage 404 in the valve body 178, the longitudinal passage 402 in the latch body 378, the annular chamber 388 between the latch body 378 and the latch piston cylinder body 370, and the radial opening 390 into the portion of the latch piston cylinder 368 on the right-hand side of the piston 366.

Air at a pressure within the normal operating range is effective to force the piston 366 leftwardly against the biasing force of the spring 396 so that the latch pin 364 is disengaged from the apertured ring 360.

When air under pressure is not supplied to the hose reel or when the air pressure is abnormally low, the spring 396 moves the piston 366 rightwardly so that the latch pin 364 engages one of the apertures 362 in the ring 360 to latch the reel 10 for preventing unreeling of the hose due to gravity.

The working parts of the hose reel, particularly as shown in Fig. 3, are in the positions they assume when the hose is partly unreeled from the reel 10. Further unreeling of the hose rotates the reel together with the shaft 50 and the pinion 102 counterclockwise. The gear 100, meshing with the pinion 102, together with the shaft 104 and the pinion 98, are thereby rotated clockwise. Consequently the rack 96, meshing with the pinion 98, is moved upwardly so that the piston 90 moves outwardly in the piston cylinder 14 toward the disc 86 closing the outer end of the piston cylinder.

The outward motion of the piston 90 compresses the air in the inner cylinder 82 between the piston and the disc 86. The air in the annular chamber 84 between the outer and inner cylindrical walls 80 and 82 is also compressed because air flows from the interior of the inner cylinder 82 through the groove 88 in the disc 86 into the annular chamber 84.

Air flows outwardly from the annular chamber 84 through the conduit 170, extending horizontally from the collar 114 which supports the air cylinder 14, and through the transverse passage 174 (Fig. 5) into the chamber 176 in the valve body 178. Air passes from the chamber 176 through the diagonal passage 220 into the upper venting valve chamber 222.

As explained previously, the shaft 104 (Fig. 4) rotates clockwise when hose is being unreeled from the reel 10. The hub 288, which is keyed to the shaft 104, and the discs 284 and 286, which are keyed to the hub 288, are also rotated clockwise.

The discs 284 and 286 frictionally exert a clockwise torque upon the discs 300 which are positioned in the apertures 302 in the camming plates 282, and a clockwise torque is thereby applied to the camming plates.

The camming plates 282 function as if they were a single member. As shown, they may be in the form of two thin plates, in order to facilitate their fabrication by punching.

Figure 7:
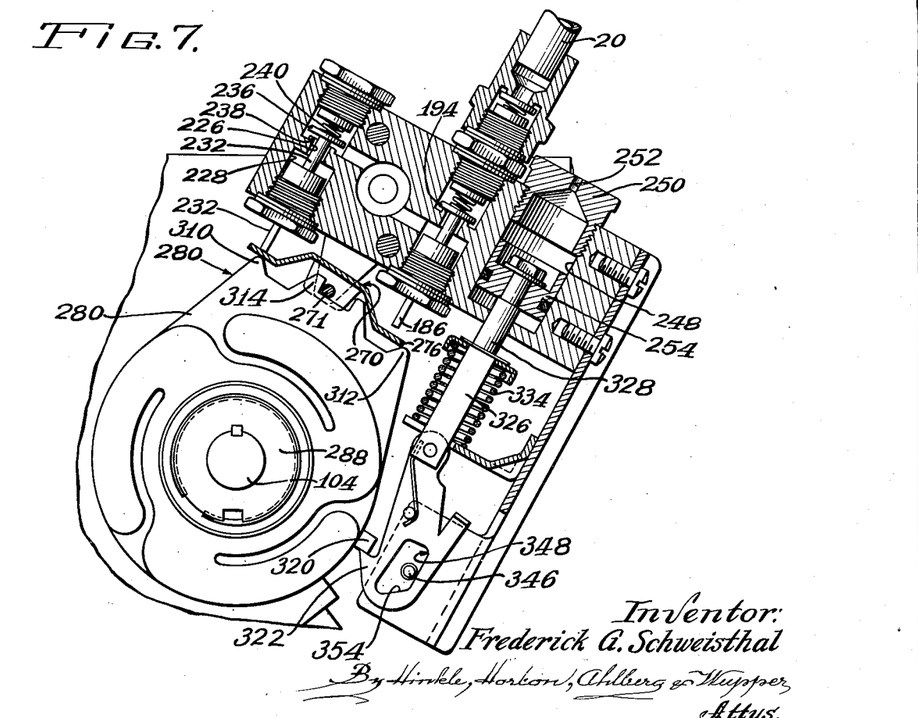
Fig. 7 is a fragmentary view similar to Fig. 4 showing changes in the positions of some of the operating parts.

The clockwise torque frictionally applied to the camming plates 282 rotates the plates until the left-hand stop 314 engages the rocker arm pin 271, as best shown in Fig. 7. Consequently, the left-hand cam 310 engages the left-hand rocker arm 274 to lift the vent valve stem 232 and thereby to disengage the vent valve disc 236 from its seat 238.

Air then passes freely between the disc 236 and the seat 238, through the aperture 226, around the valve stem 232, and into the lower venting valve chamber 228.

As shown in Fig. 5, air passes from the lower venting valve chamber 228 through the radial passage 242, the diagonal drilled conduit 244, and the transverse passage 246 into the portion of the piston cylinder 248 above the piston 254. Air is permitted to escape slowly from the piston cylinder 248 through the orifice 252 (Fig. 7) in the plug 250. However, sufficient pressure develops in the piston cylinder 248 to force the piston 254 downwardly against the biasing force of the helical spring 334.

The piston rod 328, the rectangular shank 326 extending from the piston rod, and the ratchet pawl 322 pivotally secured to the shank, are moved downward along with the piston 254. As the ratchet pawl 322 is moved downward, the pawl is rotated clockwise by the wire spring arm 340 so that the lower slanting edge 354 of the camming aperture 348 in the pawl rides on the pin 346. As best shown in Fig. 7, the downward and clockwise movements of the pawl 322 position the pawl for engagement with the aligned teeth 320 on the camming plates 282.

When the desired amount of hose has been unreeled, the unreeling motion of the reel 10 is stopped. Immediate rereeling of the hose may be prevented by restraining the hose manually or by a suitable latching mechanism which is not part of this invention and is not illustrated. The latching mechanism may operate in the manner of the latching means of a conventional roller curtain, for example. A suitable latching mechanism for use with the hose reel is described and claimed in the copending application of E. M. Foster, Serial No. 615,367, filed September 10, 1945, now Patent No. 2,563,714 issued August 7, 1951.

When the unreeling motion of the reel 10 is stopped, the air pressure in the air cylinder 14 is gradually dissipated because air flows outwardly through the orifice 252, as previously described. When the air pressure decreases to a predetermined value, the spring 334 forces the piston 254, the piston rod 328, the rectangular shank 326, and the ratchet pawl 322 upwardly. The pawl 322 engages the aligned teeth 320 on the camming plates 282, as shown in Fig. 7, so that the upward motion of the pawl rotates the camming plates counterclockwise. The counterclockwise rotation of the camming plates 282 permits the venting valve disc 236 to engage its seat 238 to prevent further passage of air out of the air cylinder 14 and opens the inlet valve 194 to admit compressed air to the piston cylinder 14 in preparation for rereeling.

As the pawl 322 moves upwardly, the pin 346 engages the slanting edge 354 of the camming aperture 348 and moves the pawl counterclockwise so that the pawl is disengaged from the teeth 320 on the camming plates.

As previously mentioned, immediate rereeling of the hose is prevented manually or by a suitable latching mechanism which forms no part of this invention and which is not illustrated. Reeling of the hose may be initiated in a manner which depends upon the particular type of latching mechanism which is employed. The usual procedure for initiating reeling of the hose is to quickly unreel a short additional length of hose and then to slacken the tension on the hose to permit rereeling thereof.

A force to provide an initial rereeling torque upon the reel 10 is normally provided by air trapped under pressure in the air cylinder 14, in the event that the inlet valve is closed by a slight unreeling movement. When the venting valve comprising the disc 236 (Fig. 4) and the seat 238 is closed by the action of the pawl 322 and the spring 334, the normal means of escape for air in the air cylinder 14 is cut off and the pressure then existing in the air cylinder is maintained for a long period of time.

Thus, air trapped in the air cylinder 14 initiates rereeling by moving the piston 90 and the rack 96 downwardly. The rack 96 rotates the pinion 98 counterclockwise together with the shaft 104, and the gear 100. The gear 100 rotates the pinion 102 clockwise, together with the shaft 50 and the reel 10.

The counterclockwise rotation of the shaft 104 (Fig. 4) produced by the reeling motion of the reel 10 rotates the hub 288, keyed to the shaft 104, and the clutch discs 284 and 286, keyed to the hub 288, counterclockwise. A counterclockwise torque is applied to the camming plates 282 by the discs 300 which are positioned in the apertures 302 in the plates and which frictionally engage the clutch discs 284 and 286. Consequently, the camming plates 282 are rotated counterclockwise until the right-hand stop 316 engages the rocker arm pin 271. The right-hand cam 312 thereby engages the right-hand rocker arm 276 to lift the inlet valve stem 186 for unseating the inlet valve disc 194.

When the disc 194 is unseated, air under pressure from the inlet fitting 20 flows through the collar 200 around the check valve disc 202 and through the nipple fitting 192 into the upper inlet valve chamber 190, and thence through the clearance hole 188 around the inlet valve stem 186 into the lower inlet valve chamber 182. The air under pressure passes from the lower inlet valve chamber 182 through the diagonal passage 180 (Fig. 5), the chamber 176 in the valve body 178, the passage 174, the connecting conduit 170 (Fig. 3), and the annular chamber 84 between the outer and inner walls 80 and 82 of the air piston cylinder 14 into the interior of the piston cylinder 14. Thus, air at the full inlet pressure is transmitted to the air cylinder 14 to provide a constant reeling force upon the piston 90.

The force of the air under pressure upon the piston 90 is ample to provide positive reeling of the hose, but may be overcome by manually grasping the hose for stopping the hose before it is fully reeled. Any slight unreeling motion of the hose following such stoppage is sufficient to rotate the camming plates 282 clockwise in the manner previously described to permit reseating of the inlet valve disc 194 for cutting off the air cylinder 14 from the air inlet 20. Such a slight unreeling motion of the hose is usually required to operate a mechanism which may be provided, as previously explained, for latching the reel to prevent immediate rereeling. This is the case with the latching mechanism of the Foster application which may be employed in connection with the hose reel of this invention, as previously described.

The hydraulic shock absorber 16 smoothly retards the rewinding speed of the reel 10 during the final stages of rewinding. As previously described, rewinding movement of the reel 10 moves the rack 96 downwardly (Fig. 3) and the piston 124, positioned in the hydraulic cylinder 16, outwardly toward the cap 132 which is threaded to the inner cylindrical wall 118 of the hydraulic cylinder.

Because the piston packing ring 126 faces outwardly, air within the hydraulic cylinder 16 is compressed by the downward motion of the piston 124. Pressure within the inner cylindrical wall 118 of the hydraulic cylinder 16 seats the valve disc 134 against the end cap 132 so that the hydraulic liquid 155 cannot escape through the openings 136 in the cap. Consequently, the hydraulic liquid 155 can escape only through the passages 140 and 144 in the cap 132. The passage 144 is restricted by the screw 146 so that considerable energy is required to force the hydraulic liquid 155 through the passage.

As the piston 124 approaches the end cap 132, the pressure in the hydraulic cylinder 16 provides increasing resistance to the movement of the piston. Some of the energy maintaining the piston 124 in motion is dissipated to force a portion of the hydraulic liquid 155 through the passage 144. Thus the reel 10, together with its operating mechanism, is stopped gradually, and excessive shock upon the reel mechanism is avoided.

Of course the portion of the hydraulic fluid 155 which passes outwardly through the passage 144 rises upwardly in the annular chamber 120 between the outer and inner cylindrical walls 116 and 118 of the hydraulic cylinder 16.

During subsequent unreeling movement of the reel 10, the pressure in the hydraulic cylinder is relieved by upward movement of the piston 124, and the valve disc 134 is disengaged from the cap 132 so that the portion of the hydraulic fluid 155 which has been forced into the annular chamber 120 can freely return to the interior of the inner cylinder 118 through the openings 136 in the cap 132 and the openings 138 and 148 in the disc 134. The levels of the hydraulic liquid 155 in the inner cylinder 118 and in the annular chamber 120 tend to equalize, for restoring the hydraulic shock absorber 16 to its normal condition in preparation for another cycle of operation.

In the course of normal use of the lubricant hose reel, the hose may occasionally be left partly unreeled for a long period of time, and the camming plates 282 may be in such a position that the inlet valve 194 is closed. When this occurs the air trapped in the air cylinder 14 may gradually leak away so that the pressure in the cylinder decreases to a value insufficient to initiate reeling motion of the piston 92. It is difficult and quite expensive to construct the air cylinder 14 so perfectly that leakage of air is entirely prevented.

However, the hose reel is constructed so that the air pressure in the air cylinder may be increased at will, by proper manipulation of the reel, to a value sufficient to initiate reeling of the hose. Reeling of the hose may be initiated by first unreeling an additional short length of hose and then slackening the tension on the hose.

As previously explained, the shaft 104 (Fig. 4), which carries the pinion 98 and the gear 100, is rotated clockwise whenever the hose is unreeled. Clockwise rotation of the discs 286, which are keyed to the hub 288 fixed to the shaft 104, produces a clockwise torque upon the camming plates 280 because of the frictional engagement of the discs 286 with the plurality of discs 300 which are positioned in apertures in the camming plates.

Consequently, the camming plates 280 rotate clockwise until the left-hand stop 314 engages the rocker arm pin 271, and the left-hand cam 310 engages the left-hand rocker arm 274 to lift the venting valve stem 232. The venting valve disc 236 thereby is lifted from its seat 238 so that air may pass from the interior of the air cylinder 14 to the piston cylinder 248.

As previously explained, upward movement of the air cylinder piston 92, produced by unreeling motion of the reel 10, compresses the air in the piston cylinder 14 sufficiently to move the pawl-operating piston 254 downwardly against the biasing force of the spring 334. Thus, as best shown in Fig. 7, the pawl 322, which is connected with the piston 254, is moved downwardly and clockwise for engaging the aligned teeth 320 on the camming plates 280.

When the tension on the hose is slackened after unreeling a short length, the air pressure developed in the air cylinder 14 and transmitted to the pawl-operating piston cylinder 248 is gradually dissipated by leakage of air through the orifice 252. As the pressure in the piston cylinder 248 decreases, the spring 334 moves the piston 254 and the pawl 322 upwardly. The pawl 322 engages the aligned teeth 320 on the camming plates 280 to rotate the camming plates counterclockwise.

Before the piston 254 and the pawl 322 return to their normal positions, the pawl is disengaged from the aligned teeth 320 by the pin 346 acting upon the inclined camming edge 354 of the camming aperture 348 in the pawl. However, before the pawl is disengaged from the aligned teeth 320, the camming plates are rotated counterclockwise an amount sufficient to unseat the inlet valve disc 194 by the engagement of the right-hand cam 312 with the right-hand rocker arm 276 and the engagement of the latter with the inlet valve stem 186.

In the manner previously described, the unseating of the inlet valve disc 194 permits compressed air to flow from the inlet fitting 20 into the interior of the air cylinder 14 so that the pressure in the air cylinder rapidly rises substantially to the pressure of the source connected with the inlet fitting 20.

Consequently, unreeling a short length of hose and then slackening the tension on the hose operates the control mechanism of the hose reel to inject a shot of air at the pressure of the inlet line into the air cylinder 14. The pressure in the air cylinder 14 thereby is raised sufficiently to operate the piston 92 for initiating reeling of the hose, and reeling proceeds in the manner already described.

It will be apparent that in the apparatus of this invention a venting valve is opened in response to an unwinding rotation of the hose reel to permit air compressed in the air cylinder to escape through an orifice. Consequently, the hose reel provides a steady, moderate resistance to unreeling of the hose. The pressure in the air cylinder is relieved through the orifice so that the resistance to unreeling does not become excessive when unreeling of the hose is nearly completed.

The pressure developed in the air cylindr due to unreeling of the hose is utilized to operate a mechanism for reclosing the venting valve when the unreeling movement is stopped. More specifically, the ratchet pawl is moved by the ratchet pawl piston to engage the valve-operating clutch plates for returning the plates to the neutral position.

In the apparatus of this invention compressed air is supplied from a source such as a compressor to the air cylinder during reeling movement of the reel to provide a constant reeling torque. This is accomplished by means of an inlet valve which is opened in response to reeling motion of the reel.

Means is provided by this invention to open the inlet valve in response to manual manipulation of the hose. The ratchet pawl is engaged with the clutch plates, which operate the inlet valve, when a short length of hose is unreeled, and the pawl moves the plates to open the inlet valve when tension on the hose is slackened. Consequently, a shot of compressed air from the pressure source can always be injected into the air cylinder to provide sufficient pressure to initiate rewinding of the hose, even if the pressure of the air trapped in the air cylinder has been dissipated by leakage.

According to this invention, a low pressure latch is provided to prevent unwinding of the hose should the air supply pressure drop below a predetermined value. This feature prevents the hose from becoming completely unwound during a long shutdown of the air supply.

While I have shown and described a preferred embodiment of my invention, it will be apparent that numerous variations and modifications thereof may be made without departing from the underlying principles of the invention. Therefore, I desire by the following claims to include within the scope of the invention all such variations and modifications by which substantially the results of my invention may be obtained through the use of substantially the same or equivalent means.

I claim:

1. Reeling apparatus, comprising a reel, an air cylinder including a piston movable in a given direction to produce reeling rotation of the reel, an outlet vent, a valve for connecting the air cylinder with the vent, and means to open the valve in response to unreeling rotation of the reel to permit the gradual escape of air trapped in the air cylinder and compressed by movement of the piston in a direction opposite the given direction.

2. Reeling apparatus, comprising a reel, an air motor connected to the reel for producing reeling rotation of the reel, a compressed air inlet, means connecting the air motor with the inlet, a member engageable with the reel to prevent unreeling rotation thereof, yieldable means biasing the member toward engagement with the reel, pressure responsive means for moving the member out of engagement with the reel, and a conduit constantly connecting the pressure responsive means to the inlet for releasing the reel whenever the inlet pressure exceeds a predetermined value.

3. Reeling apparatus, comprising a reel, an air cylinder including a piston movable in a given direction to produce reeling rotation of the reel, an outlet vent, a valve for connecting the air cylinder with the vent, and means including a slipping coupling between the reel and the valve to open the valve in response to unreeling rotation of the reel to permit the gradual escape of air trapped in the air cylinder and compressed by movement of the piston in a direction opposite the given direction.

4. A reel mechanism powered by compressed air, comprising a reel, an air motor for producing reeling rotation of the reel, a compressed air inlet, an inlet valve for connecting the inlet with the motor, means to open the inlet valve in response to reeling rotation of the reel to supply compressed air to the motor, an outlet vent, an outlet valve connecting the motor with the outlet vent, and means to open the outlet valve in response to unreeling rotation of the reel gradually to relieve back pressure produced in the motor by unreeling rotation of the reel.

5. A reeling apparatus, comprising a reel, an air motor for producing reeling rotation of the reel, a compressed air inlet, an inlet valve for connecting the inlet with the motor, a piston cylinder having a piston, a vent connected with the piston cylinder, an outlet valve for connecting the air motor with the piston cylinder, a camming member rockable in one direction for opening the inlet valve and in the opposite direction for opening the outlet valve, means forming a slipping coupling between the reel and the camming member for moving the camming member to open the inlet and outlet valves respectively in response to reeling and unreeling rotation of the reel, a pawl movable to an extended position for engaging the camming member, means connecting the pawl with the piston for moving the pawl to the extended position in response to back pressure of air admitted to the piston cylinder from the air motor by the outlet valve during unreeling, and a spring biasing the pawl toward a retracted position for retracting the pawl after unreeling when the back pressure is sufficiently dissipated and for moving the camming member to close the outlet valve and open the inlet valve, to energize the motor in preparation for reeling.

6. Reeling apparatus, comprising a reel, an air motor for producing reeling rotation of the reel, a compressed air inlet, means for connecting the air motor with the inlet, means forming a plurality of circularly disposed latch abutments on the reel, a latch member engageable with the abutments positively to prevent unreeling rotation thereof, pressure responsive means connected with the inlet normally moving the latch member out of engagement with the abutments, and a spring for moving the latch member into engagement with the abutments whenever the inlet pressure drops below a predetermined value insufficient to operate the air motor.

7. A reel mechanism powered by compressed air, comprising a reel, an air motor for producing reeling rotation of the reel, a compressed air inlet, an inlet valve for connecting the inlet with the motor to energize the motor with compressed air, an outlet vent, a valve for connecting the motor with the outlet vent gradually to relieve pressure in the motor, valve operating means movable in a first direction to open the inlet valve and movable in a second opposite direction to open the outlet valve, and a frictional slipping coupling between the reel and the valve operating means to move the latter to open the inlet valve in response to reeling movement of the reel and the outlet valve in response to unreeling movement of the reel, gradually to relieve back pressure produced in the motor by unreeling rotation of the reel.

8. A reeling apparatus, comprising a reel, an air motor for producing reeling rotation of the reel, a compressed air inlet, an inlet valve normally biased closed for connecting the inlet with the motor, a control piston cylinder having a piston positioned therein, a vent connected with the piston cylinder, an outlet valve normally biased closed for connecting the air motor with the piston cylinder and the vent, a camming member rockable in one direction for opening the inlet valve and in the opposite direction for opening the outlet valve, means forming a slipping coupling between the reel and the camming member for moving the camming member to open the inlet and outlet valves respectively in response to reeling and unreeling rotation of the reel, a pawl movable to an extended position for engaging the camming member, means connecting the pawl with the piston for moving the pawl to the extended position in response to back pressure of air admitted to the piston cylinder from the air motor by the outlet valve during unreeling, a spring biasing the pawl toward a retracted position for retracting the pawl after unreeling when the back pressure is sufficiently dissipated and for moving the camming member to close the outlet valve and open the inlet valve in preparation for rereeling, and pressure responsive means connected with the inlet for restraining unreeling movement of the reel whenever the pressure at the inlet drops below a predetermined value insufficient to operate the air motor.

9. A reel mechanism powered by compressed air, comprising a reel, an air motor for producing reeling rotation of the reel, a compressed air inlet, an inlet valve normally biased closed for connecting the inlet with the motor, means to open the inlet valve in response to reeling rotation of the reel to supply compressed air to the motor, means connected to the inlet for restraining unreeling rotation of the reel whenever the inlet pressure drops below a predetermined value insufficient to operate the motor, an outlet vent, an outlet valve normally biased closed for connecting the motor with the outlet vent, and means to open the outlet valve in response to unreeling rotation of the reel gradually to relieve back pressure produced in the motor by unreeling.

10. A reel mechanism powered by compressed air, comprising a reel, an air motor connected to the reel for rotating the reel in a reeling direction, a compressed air inlet, a normally closed valve connected between the inlet and the motor, and a slippable torque transmitting device connected between the reel and the valve to open the valve in response to rotation of the reel in the reeling direction to supply compressed air to the motor.

11. A reel mechanism powered by compressed air, comprising a reel, an air motor connected to the reel for producing reeling rotation of the latter, a compressed air inlet, an inlet valve normally biased closed and connected between the inlet and the motor, a frictional coupling device connected between the reel and the valve to open the latter in response to reeling rotation of the reel to supply compressed air to the motor, a restraining device releasable by air pressure and connected to the inlet for restraining unreeling rotation of the reel, and a conduit constantly connecting the restraining device to the inlet for restraining the reel whenever the inlet pressure drops below a predetermined value insufficient to operate the motor.

FREDERICK G. SCHWEISTHAL.

REFERENCES CITED

The following references are of record in the file of this patent:

UNITED STATES PATENTS

| Number | Name | Date |
|---|---|---|
| 1,151,890 | McConnell | Aug. 31, 1915 |
| 2,499,909 | Fox | Mar. 7, 1950 |